(12) United States Patent
Fondeur

(10) Patent No.: US 9,363,581 B2
(45) Date of Patent: Jun. 7, 2016

(54) COMPACT MULTICAST SWITCHES, MXN SWITCHES AND MXN SPLITTERS

(71) Applicant: Lumentum Operations LLC, Milpitas, CA (US)

(72) Inventor: Barthelemy Fondeur, San Jose, CA (US)

(73) Assignee: Lumentum Operations LLC, Milpitas, CA (US)

( * ) Notice: Subject to any disclaimer, the term of this patent is extended or adjusted under 35 U.S.C. 154(b) by 392 days.

(21) Appl. No.: 13/852,443

(22) Filed: Mar. 28, 2013

(65) Prior Publication Data

US 2014/0294344 A1    Oct. 2, 2014

(51) Int. Cl.
*G02B 6/26* (2006.01)
*G02B 6/42* (2006.01)
*H04Q 11/00* (2006.01)
*G02B 6/35* (2006.01)

(52) U.S. Cl.
CPC .......... *H04Q 11/0005* (2013.01); *G02B 6/3546* (2013.01); *H04Q 2011/0015* (2013.01); *H04Q 2011/0049* (2013.01)

(58) Field of Classification Search
CPC ............. G02B 6/3546; G02B 6/29355; H04Q 11/0001; H04Q 2011/0015; H04Q 2011/0049
See application file for complete search history.

(56) References Cited

U.S. PATENT DOCUMENTS

| | | | |
|---|---|---|---|
| 4,787,692 A * | 11/1988 | Spanke | 385/17 |
| 4,852,958 A | 8/1989 | Okuyama | |
| 5,828,800 A * | 10/1998 | Henry | G02B 6/13 385/16 |
| 6,259,834 B1 | 7/2001 | Shani | |
| 6,285,809 B1 | 9/2001 | Nir | |
| 6,741,775 B2 | 5/2004 | Sakuma | |
| 6,909,835 B2 | 6/2005 | Doerr | |
| 7,261,982 B2 | 8/2007 | Fondeur | |
| 7,430,346 B2 * | 9/2008 | Jennen | 385/17 |
| 7,440,650 B2 | 10/2008 | Fondeur | |
| 7,974,502 B2 | 7/2011 | Mino | |
| 2011/0153283 A1 | 6/2011 | Kohara | |

FOREIGN PATENT DOCUMENTS

JP    63-050193    3/1988

OTHER PUBLICATIONS

Spanke, Ron A., "Architectures for Guided-Wave Optical Space Switching Systems" IEEE Communications Magazine, vol. 25, Issue 5, May 1987, pp. 42-48.
Jajszczyk, A.; "Tree-type photonic switching networks" Network, IEEE, vol. 9, Issue: 1 pp. 10-16.
Tomoaki Kato et al., "Hybrid integrated 4×4 optical matrix switch module on silica based planar waveguide platform",IEEE Trans. Electron., vol. E82-C No. 2 pp. 305-311 (Feb. 1999).
English Language Abstract issued in JP 63-050193 published Mar. 3, 1988.

* cited by examiner

*Primary Examiner* — Mike Stahl
*Assistant Examiner* — Kajli Prince
(74) *Attorney, Agent, or Firm* — Harrity & Harrity, LLP

(57) ABSTRACT

New architectures for multicast switches, and other optical switches and splitters, that have substantially reduced insertion loss, crosstalk and better overall optical performance in comparison to existing optical switches and splitters. Optimized waveguide mesh layouts are used to substantially reduce the number of waveguide crossings, which reduces insertion loss. The reduction in the number of crossings also reduces the complexity of the mesh and provides better crossing angles to reduce crosstalk and other issues. Instead of crossing all of the waveguides connected between splitter outputs and switch inputs, the waveguides are crossed in sets of waveguides.

20 Claims, 6 Drawing Sheets

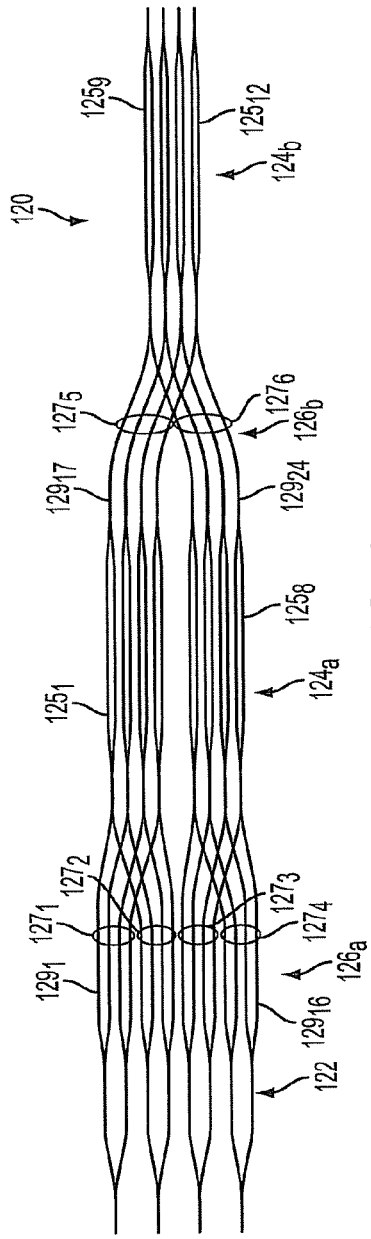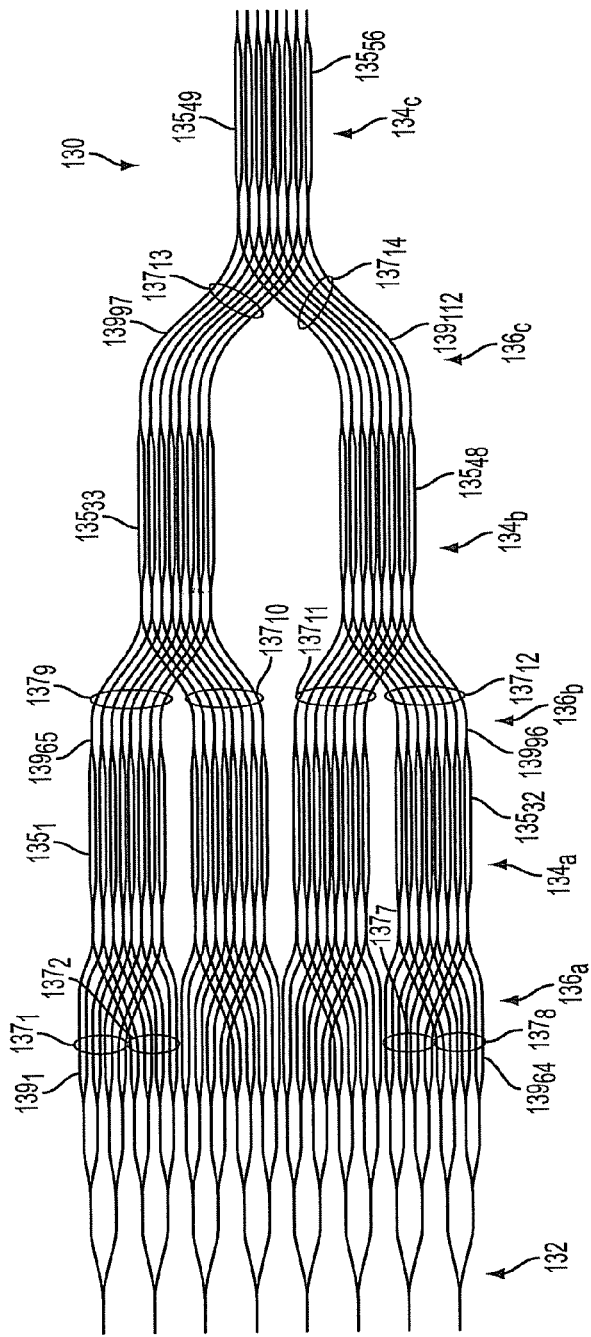

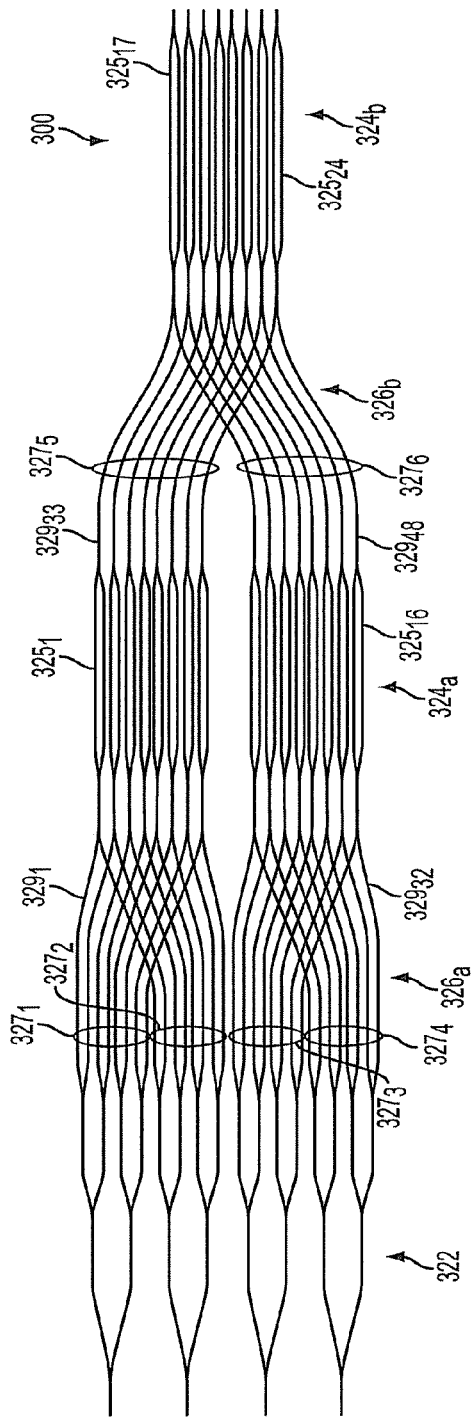
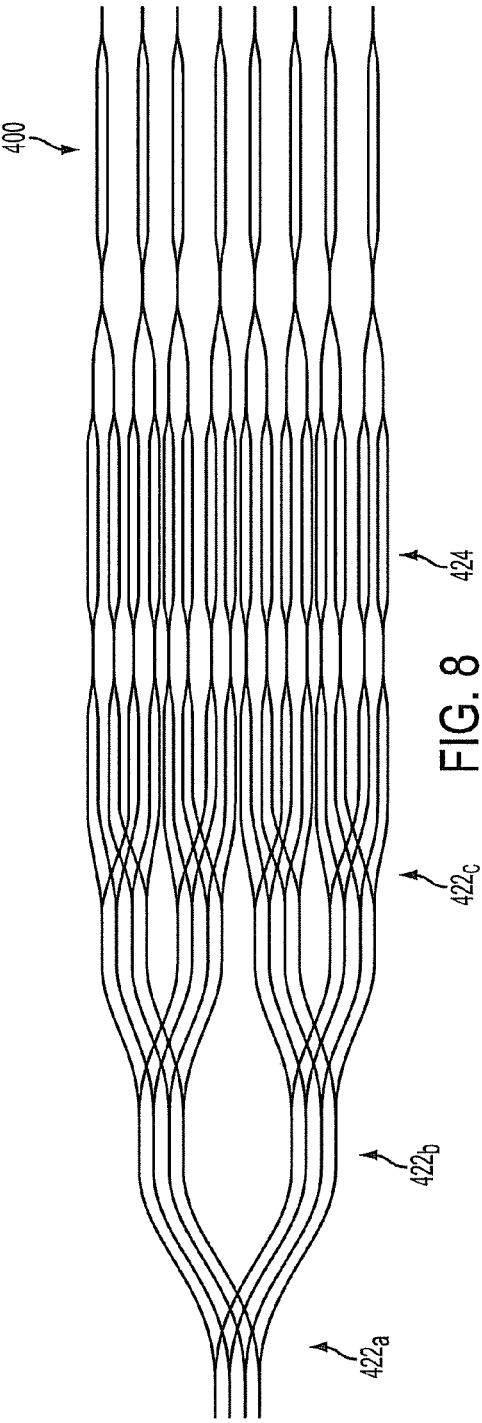
FIG. 7
FIG. 8

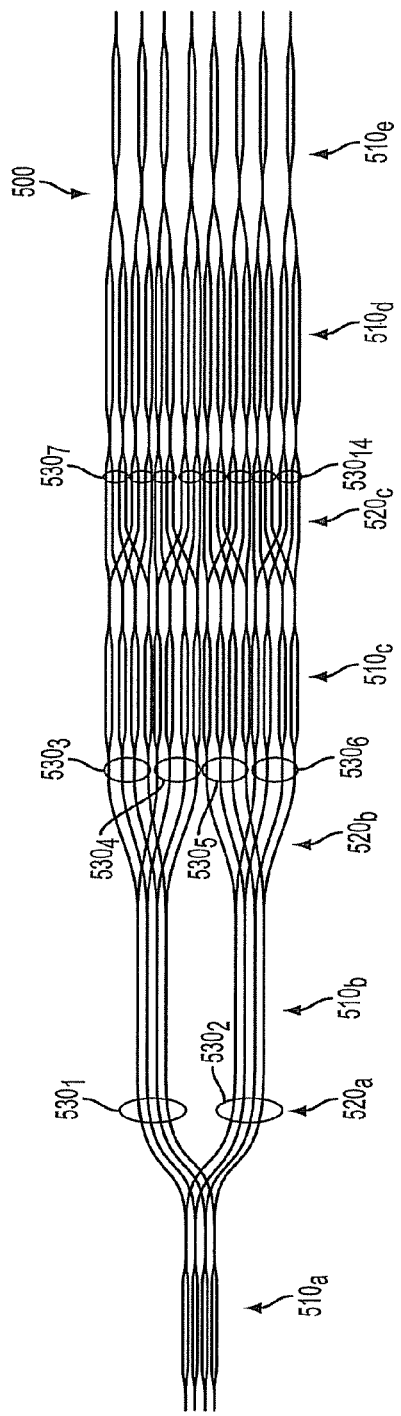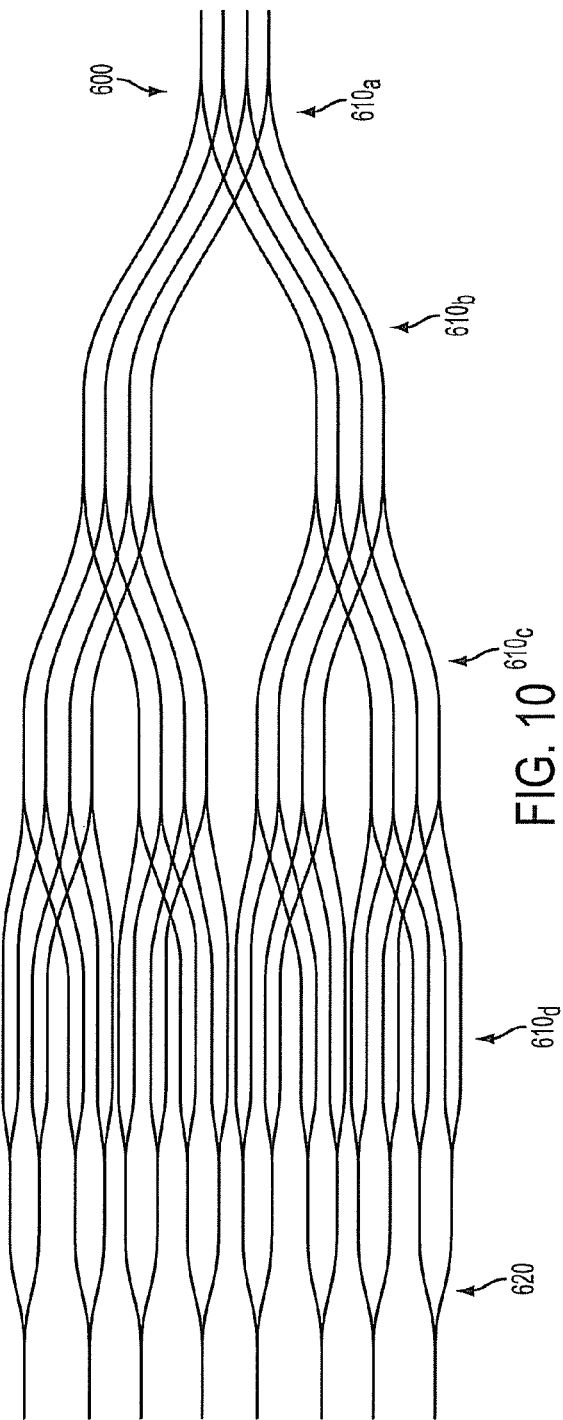

US 9,363,581 B2

COMPACT MULTICAST SWITCHES, M×N SWITCHES AND M×N SPLITTERS

FIELD OF THE INVENTION

Embodiments of the invention relate to optical network switches and splitters and, more particularly, to multicast switches, M×N switches and M×N splitters used in optical networks.

BACKGROUND

As technology advances, there is a need for optical networks to become colorless, directionless, and contentionless (CDC). These types of networks require new colorless optical components that can re-route any optical signal from any input node to any output node.

An M×N multicast switch (MCS) is one of the components suitable for use in a CDC network. A typical M×N multicast switch 10 is illustrated in FIG. 1. As can be seen, the multicast switch 10 comprises a number M of 1×N splitters $12_1, \ldots, 12_M$ (collectively "splitters 12") for splitting up optical signals received via M inputs to the switch 10. The multicast switch 10 also comprises a number N of M×1 switches $14_1, \ldots, 14_N$ (collectively "switches 14") for collecting signals from the output of the splitters 12 and outputting the signals to selected ones of N outputs from the switch 10. A control mechanism (not shown) ensures that the switches 14 are set to output the correct signal.

It is known that PLC (planar lightwave circuit) technology is well suited for implementing the M×N multicast switch 10, as both the splitters 12 and switches 14 can be fabricated with good optical performance. However, and as can be appreciated, the difficulty arises in how to get all of the splitter 12 outputs connected to the appropriate inputs of all of the switches 14 without impacting the optical performance of the switch 10 and without making the switch 10 too large, complex or costly. The problem is compounded for larger switches 10 as the number of splitter 12 outputs and switch 14 inputs increases exponentially.

FIG. 1 illustrates the outputs of splitter $12_1$ and $12_M$ as being connected to certain inputs of the switches 14. As mentioned above, all of the splitter 12 outputs would need to be connected to appropriate inputs of all of the switches 14. Optical waveguides can be used for this purpose and are a viable solution to the connection problem described above. In one form, optical waveguides can be implemented as a mesh of light paths formed within the substrate containing the splitters 12 and switches 14. As can be seen in FIG. 1, there will be several points 13 (only a few of which are labeled) where the optical waveguides cross each other.

Unfortunately, each crossing adds an insertion loss (IL) to the throughput of the corresponding optical path, which is undesirable. It is known that a typical waveguide crossing loss is around 0.05 dB per crossing. As can be seen in FIG. 1, it is also apparent that the number of crossings will vary greatly: from none in the outer paths to (M−1)*(N−1) for some of the inner paths. This will lead to paths with higher insertion loss, which increases both the worst-case insertion loss as well as the insertion loss uniformity (ILU) of all of the paths in the switch 10.

Moreover, some of the light within one waveguide can be transferred to a crossing waveguide if the angle between the two waveguides is too low. As can be appreciated, the mesh gets more and more complicated as the number of splitters 12 and switches 14 increase, which leads to lower angles in some of the crossings. This situation is also undesirable because the overall isolation of the multicast switch 10 is degraded by the light transfer.

FIG. 2 illustrates an example 4×4 multicast switch 20 using a mesh 26 of optical waveguides to connect the outputs of splitters 22 to the inputs of switches 24. The outside paths such as path $23_1$ has no crossings, while the other paths (e.g., path $23_2$) can have can have up to nine crossings each. This means that the mesh 26 used in switch 20 experiences insertion loss anywhere from 0 to about 0.45 dB per optical path, which as noted above is undesirable.

FIG. 3 illustrates an example 8×8 multicast switch 30 using a mesh 36 of optical waveguides to connect the outputs of splitters 32 to the inputs of switches 34. The outside paths such as path $33_1$ has no crossings, while the other paths (e.g., path $33_2$) can have can have up to forty-nine crossings. This means that the mesh 36 used in switch 30 experiences insertion loss anywhere from 0 to about 2.45 dB per optical path. As can be seen, the FIG. 3 mesh 36 is much more complex than the FIG. 2 mesh 20, which leads to the greater insertion loss as well as low crossing angles (and potential crosstalk) in some of its paths.

There have been attempts to overcome similar problems in the past for other types of optical switches. For example, U.S. Pat. No. 4,787,692 discloses an optical switching element comprising multiple stages of active switches interconnected by optical waveguides. In one embodiment, the architecture of the '692 patent has four regions of crossovers, and other regions of switches. This arrangement, however, is still not suitable for today's needs.

U.S. Pat. No. 4,852,958 discloses an optical matrix switch comprising a tree-type structure having an input branching tree connected to an output merging tree through a stage of 2×2 switches, waveguides and dummy waveguides. The disclosed architecture is still complex, still has crossovers and requires active switches in addition to waveguide and dummy waveguide connections.

Jajszczyk et al., "Tree-type Photonic Switching Networks", IEEE Network, vol. 9 no. 1 pp. 10-16 (1995), discloses various tree-type architectures for photonic switching networks, included guided-wave based switching elements. Each architecture has its advantages and disadvantages, uses different amounts of active elements, and experiences different types of crossovers, insertion loss, and signal-to-noise ratios. The disclosed architectures, however, do not reduce the number of crossings enough for today's technological requirements.

Thus, there remains a need to further reduce the number of waveguide crossings in optical switches such as M×N multicast switches and other M×N optical components.

SUMMARY

An embodiment disclosed herein provides an optical switching element comprising a first stage having M inputs and being adapted to split each input into N first stage outputs, wherein M and N are integers greater than one; and a second stage connected to the first stage outputs and having N outputs, said second stage comprising at least first and second waveguide areas and at least first and second output switch areas. The first waveguide area comprises a plurality of waveguides connected between the first stage outputs and inputs of switches in the first output switch area, and the second waveguide area comprises a plurality of waveguides connected between outputs of the switches in the first output switch area and inputs of switches in the second output switch area. The waveguides in the first and second waveguide areas cross other waveguides in the same waveguide area in respective sets of waveguides, wherein each set comprises two or more waveguides.

Another embodiment disclosed herein provides an optical network element comprising M inputs and N outputs, said optical network element comprising at least one stage comprising a plurality of waveguide areas, wherein waveguides within each waveguide area cross other waveguides in the same waveguide area in sets of waveguides.

Further areas of applicability of the present disclosure will become apparent from the detailed description, drawings and claims provided hereinafter. It should be understood that the detailed description, including disclosed embodiments and drawings, are merely exemplary in nature intended for purposes of illustration only and are not intended to limit the scope of the invention, its application or use: Thus, variations that do not depart from the gist of the invention are intended to be within the scope of the invention.

BRIEF DESCRIPTION OF THE DRAWING

FIG. 4 illustrates an example 4×4 multicast switch using optical waveguides constructed in accordance with the disclosed principles.

FIG. 5 illustrates an example 8×8 multicast switch using optical waveguides constructed in accordance with the disclosed principles.

FIG. 7 illustrates an example of M×N optical switch constructed in accordance with the disclosed principles.

FIG. 8 illustrates another example of M×N optical switch constructed in accordance with the disclosed principles.

FIG. 9 illustrates yet another example M×N optical switch constructed in accordance with the disclosed principles.

FIG. 10 illustrates an example of M×N optical splitter constructed in accordance with the disclosed principles.

DETAILED DESCRIPTION

As will become apparent from the following description, the embodiments disclosed herein provide new architectures for multicast switches, and other optical switches and splitters, that have substantially reduced insertion loss, crosstalk and better overall optical performance in comparison to existing optical switches and splitters. The embodiments disclosed herein feature optimized waveguide mesh layouts that substantially reduce waveguide crossings, which reduces insertion loss. The reduction in crossings also reduces the complexity of the mesh and provides better crossing angles to reduce crosstalk and other issues. Instead of crossing all of the waveguides connected between splitter outputs and switch inputs, the waveguides are crossed in sets of waveguides, which dramatically reduces the number of crossings and the problems associated thereto.

FIG. 4 illustrates an example 4×4 multicast switch 120 constructed in accordance with the disclosed principles. In this embodiment, the number M of inputs is four and the number N of outputs is four. The switch 120 includes four 1×4 splitters 122 serving as an input stage of the switch 120. The first stage is connected to a second stage comprising a first mesh area $126_a$, a first switch area $124_a$, a second mesh area $126_b$, and a second switch area $124_b$. In a desired embodiment, all of the components in the switch 120 are connected to or part of the same substrate. The first switch area $124_a$ comprises eight 2×1 switches $125_1, \ldots, 125_8$. The second switch area $124_b$ comprises four 2×1 switches $125_9, \ldots, 125_{12}$. In one embodiment, the switches $125_1, \ldots, 125_{12}$ are Mach-Zehnder (MZ) switches. It should be appreciated that any suitable 2×1 switch can be used for the switches $125_1, \ldots, 125_{12}$, MZ switches being one example that can be used in the illustrated embodiment.

The first mesh area $126_a$ comprises sixteen waveguides $129_1, \ldots, 129_{16}$, each having one end connected to a respective output of one of the splitters 122. The other ends of the waveguides $129_1, \ldots, 129_{16}$ are respectively connected to one of the inputs of the switches $125_1, \ldots, 125_8$ of the first switch area $124_a$. The second mesh area $126_b$ comprises eight waveguides $129_{17}, \ldots, 129_{24}$, each having one end connected to a respective output of one the switches $125_1, \ldots, 125_8$ of the first switch area $124_a$. The other ends of the waveguides $129_{17}, \ldots, 129_{24}$ are respectively connected to one of the inputs of the switches $125_9, \ldots, 125_{12}$ of the second switch area $124_b$. A control mechanism (not shown) ensures that the switches $125_9, \ldots, 125_{12}$ are set to output the correct signal during operation of the switch 120.

Figure 1:
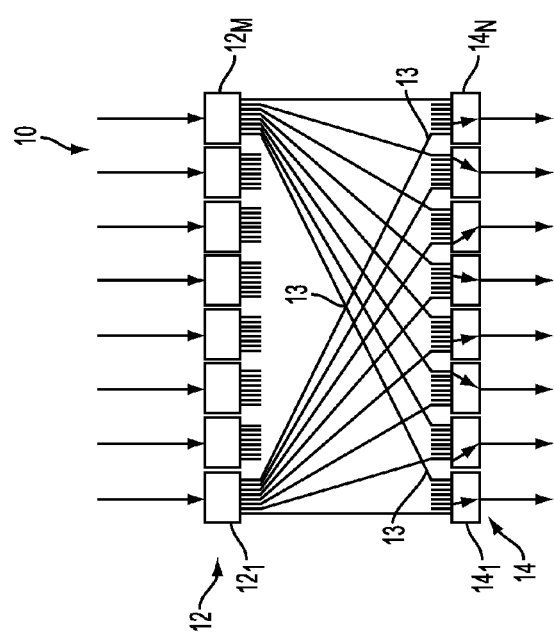
FIG. 1 illustrates an example M×N multicast switch comprising M 1×N splitters and N M×1 switches.
Figure 2:
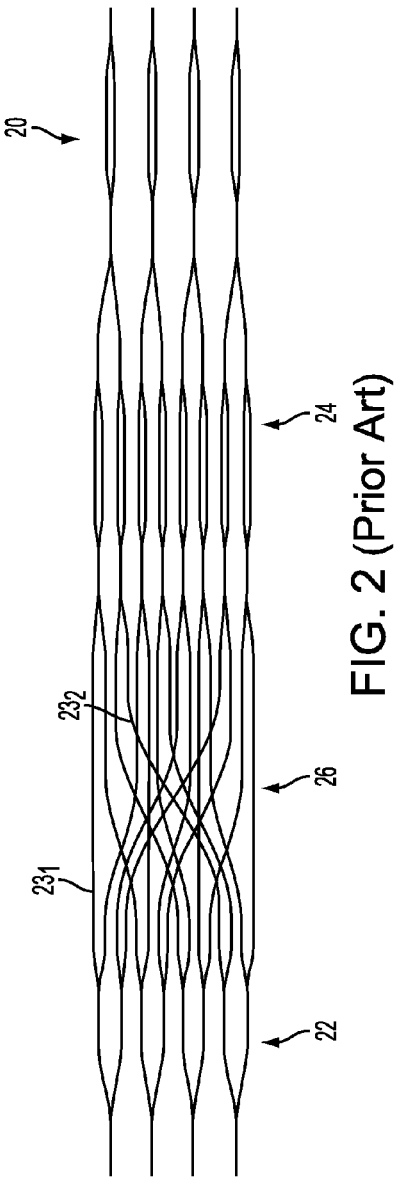
FIG. 2 illustrates an example 4×4 multicast switch using optical waveguides to connect the outputs of splitters to the inputs of switches.
Figure 3:
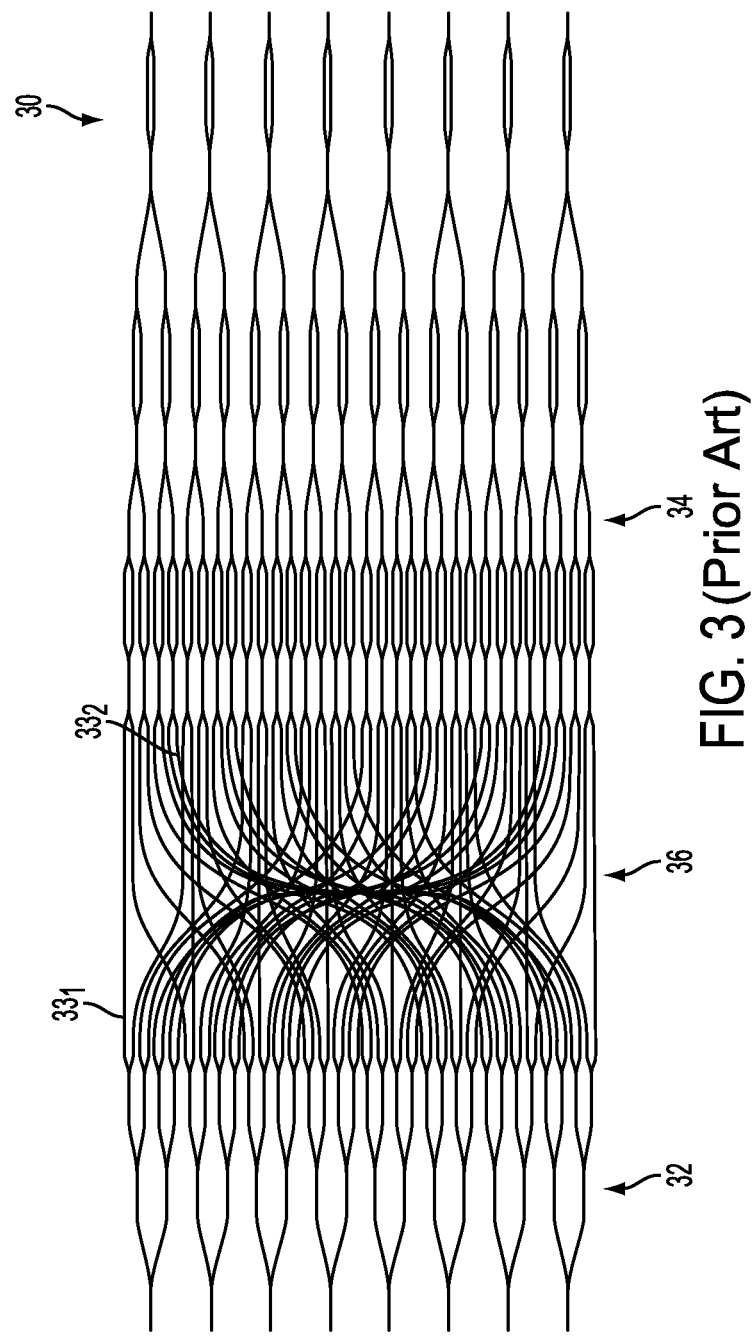
FIG. 3 illustrates an example 8×8 multicast switch using optical waveguides to connect the outputs of splitters to the inputs of switches.

Unlike the waveguides used in the meshes 26, 36 illustrated in FIGS. 2 and 3, the waveguides $129_1, \ldots, 129_{24}$ in the first and second mesh areas $126_a$, $126_b$ are crossed in sets $127_1$, $127_2$, $127_3$, $127_4$, $127_5$, $127_6$ of waveguides. In the illustrated embodiment, sets $127_1$ crosses with set $127_2$, set $127_3$ crosses with set $127_4$, and set $127_5$ crosses with set $127_6$. In the illustrated embodiment, the number of waveguides in each set $127_1$, $127_2$, $127_3$, $127_4$, $127_5$, $127_6$ is four, matching the number N of outputs from the switch 120. It should be appreciated, however, that even though the waveguides $129_1, \ldots, 129_{24}$ are grouped into sets $127_1$, $127_2$, $127_3$, $127_4$, $127_5$, $127_6$, and each set $127_1$, $127_2$, $127_3$, $127_4$, $127_5$, $127_6$ crosses with another set, one waveguide in each set will not cross another waveguide as that waveguide will already be in proper position for its connection to a switch (e.g., waveguides $129_1$, $129_{16}$, $129_{17}$, $129_{24}$ do not cross other waveguides even though they are part of a set).

The largest number of crossings is reduced from (N−1)×(M−1) to (N−1)×log 2 (M). For example, in the illustrated embodiment, the 4×4 switch 120 can have at most six crossings instead of the nine crossings experienced by paths in the mesh 26 illustrated in FIG. 2. Six crossings would only result in about a 0.3 dB loss, which is a substantial improvement over prior 4×4 multicast and other switches. In addition, the reduction in the number of crossings makes the mesh areas $126_a$, $126_b$ less susceptible to crosstalk as larger crossing angles can be achieved due to less congestion in these areas. This is another benefit over prior multicast and other switches.

FIG. 5 illustrates an example 8×8 multicast switch 130 constructed in accordance with the disclosed principles. In this embodiment, the number M of inputs is eight and the number N of outputs is eight. The switch 130 includes eight 1×8 splitters 132 serving as a first stage of the switch 130. The first stage is connected to a second stage comprising a first mesh area $136_a$, a first switch area $134_a$, a second mesh area $136_b$, a second switch area $134_b$, a third mesh area $136_c$, and a third switch area $134_c$. In a desired embodiment, all of the components in the switch 130 are connected to or part of the same substrate. The first switch area $134_a$ comprises thirty-two 2×1 switches $135_1, \ldots, 135_{32}$. The second switch area $134_b$ comprises sixteen 2×1 switches $135_{33}, \ldots, 135_{48}$ and the third switch area $134_c$ comprises eight 2×1 switches $135_{49}, \ldots, 135_{56}$. In one embodiment, the switches $135_1, \ldots, 135_{56}$ are MZ switches. It should be appreciated that any suitable 2×1 switch can be used for the switches $135_1, \ldots, 135_{56}$, MZ switches being one example that can be used in the illustrated embodiment.

The first mesh area $136_a$ comprises sixty-four waveguides $139_1, \ldots, 139_{64}$, each having one end connected to a respective output of one of the splitters 132. The other ends of the waveguides $139_1, \ldots, 139_{64}$ are respectively connected to one of the inputs of the switches $135_1, \ldots, 125_{32}$ of the first switch area $134_a$. The second mesh area $136_b$ comprises thirty-two waveguides $139_{65}, \ldots, 139_{96}$, each having one end connected to a respective output of one the switches $135_1, \ldots, 135_{32}$ of the first switch area $134_a$. The other ends of the waveguides $139_{65}, \ldots, 139_{96}$ are respectively connected to one of the inputs of the switches $135_{33}, \ldots, 135_{48}$ of the second switch area $134_b$. The third mesh area $136_c$ comprises sixteen waveguides $139_{97}, \ldots, 139_{112}$, each having one end connected to a respective output of one the switches $135_{33}, \ldots, 135_{48}$ of the second switch area $134_b$. The other ends of the waveguides $139_{97}, \ldots, 139_{112}$ are respectively connected to one of the inputs of the switches $135_{49}, \ldots, 135_{56}$ of the third switch area $134_c$. A control mechanism (not shown) ensures that the switches $135_{49}, \ldots, 135_{56}$ are set to output the correct signal during operation of the switch 130.

Unlike the waveguides used in the meshes 26, 36 illustrated in FIGS. 2 and 3, the waveguides $139_1, \ldots, 139_{112}$ in the first, second and third mesh areas $136_a$, $136_b$, $136_c$ are crossed in sets $137_1, 137_2, \ldots, 137_{13}, 137_{14}$ of waveguides. For example, set $137_1$ crosses with set $137_2$, set $137_7$ crosses with set $137_8$, set $137_9$ crosses with set $137_{10}$, set $137_{11}$ crosses with set $137_{12}$, and sets $137_{13}$ crosses set $137_{14}$. In the illustrated embodiment, the number of waveguides in each set $137_1, 137_2, \ldots, 137_{13}, 137_{14}$ is eight, matching the number N of outputs from the switch 130. It should be appreciated, however, that even though the waveguides $139_1, \ldots, 139_{112}$ are grouped into sets $137_1, \ldots, 137_{14}$, and each set $137_1, \ldots, 137_{14}$ crosses with another set, one waveguide in each set will not cross another waveguide as that waveguide will already be in proper position for its connection to a switch (e.g., waveguides $139_1, 139_{64}, 139_{65}, 139_{96}, 139_{97}$ and $139_{112}$ do not cross other waveguides even though they are part of a set).

The largest number of crossings is reduced from (N−1)×(M−1) to (N−1)×log 2 (M). For example, in the illustrated embodiment, the 8×8 switch 130 can have at most twenty-one crossings instead of the forty-nine crossings experienced by paths in the mesh 36 illustrated in FIG. 3. Twenty-one crossings would only result in about a 1.05 dB loss, which is a substantial improvement over prior 8×8 multicast and other switches. In addition, the reduction in the number of crossings makes the mesh areas $136_a$, $136_b$, $136_c$ less susceptible to crosstalk as larger crossing angles can be achieved due to less congestion in these areas. This is another benefit over prior multicast and other switches.

Figure 6:
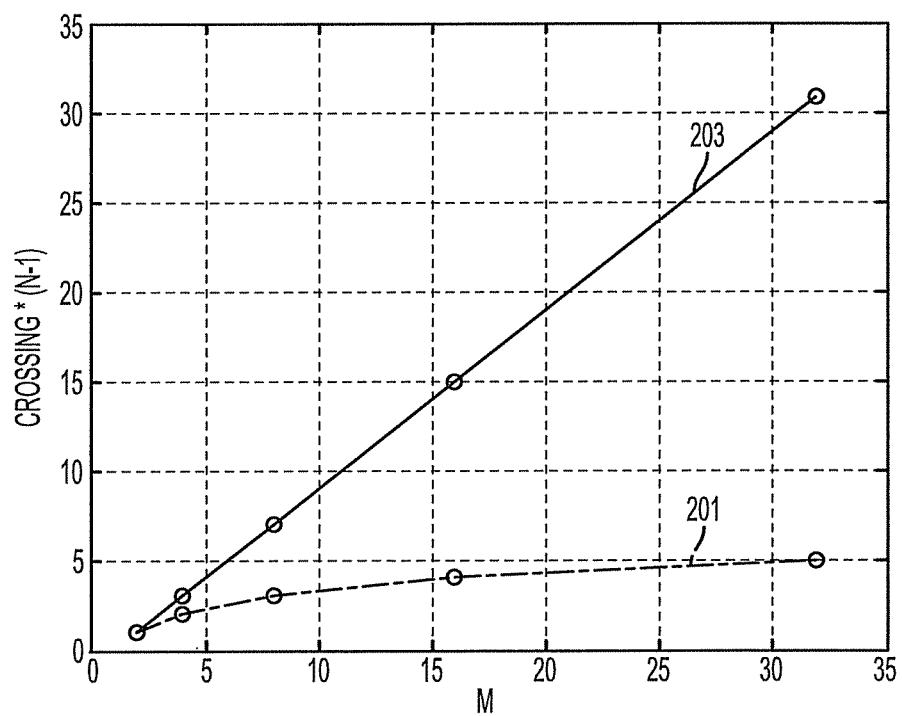
FIG. 6 is a graph comparing the number of waveguide crossings in a switch constructed in accordance with the disclosed principles to a switch constructed in accordance with the convention technique.

As can be seen, the disclosed techniques provides the switches 120, 130 with simple layouts regardless of the number of splitters and switches used. There is also substantially less crossings than the conventional technique illustrated in FIGS. 2 and 3. FIG. 6 is a graph comparing the number of waveguide crossings in a switch constructed in accordance with the disclosed principles (i.e., FIGS. 4 and 5) to a switch constructed in accordance with the conventional technique (i.e., FIGS. 2 and 3). Line 201 illustrates the crossings of switches constructed in accordance with the disclosed principles (i.e., log 2 (M)) while line 203 illustrates the crossings of switches constructed in accordance with the conventional technique (i.e., (N−1)).

It should be noted that the disclosed embodiments have been described with reference to multicast switches having the same number M of inputs as the number N of outputs. Moreover, the embodiments have been shown with use of passive splitter/active combiner (PS/AC) configurations. It should be appreciated, however, that the disclosed principles are not limited to these types of switches or configurations. For example, the switch can comprise less than 4 inputs and/or outputs or more than eight inputs and/or outputs. Other example embodiments will now be described to reflect further applications of the disclosed principles.

FIG. 7 illustrates an example of 4×8 multicast switch 300 constructed in accordance with the disclosed principles. The disclosed switch 300 includes four 1×4 splitters 322 serving as a first stage of the switch 300, which is connected to a second stage comprising a first mesh area $326_a$, a first switch area $324_a$, a second mesh area $326_b$, and a second switch area $324_b$. In a desired embodiment, all of the components in the switch 300 are connected to or part of the same substrate. The first switch area $324_a$ comprises sixteen 2×1 switches $325_1, \ldots, 325_{16}$. The second switch area $324_b$ comprises eight 2×1 switches $325_{17}, \ldots, 325_{24}$. As with the other disclosed embodiments, the switches $325_1, \ldots, 325_{24}$ can be, but are not limited to, Mach-Zehnder (MZ) switches.

The first mesh area $326_a$ comprises thirty-two waveguides $329_1, \ldots, 329_{32}$, each having one end connected to a respective output of one of the splitters 322. The other ends of the waveguides $329_1, \ldots, 329_{32}$ are respectively connected to one of the inputs of the switches $325_1, \ldots, 325_{16}$ of the first switch area $324_a$. The second mesh area $326_b$ comprises sixteen waveguides $329_{33}, \ldots, 329_{48}$, each having one end connected to a respective output of one the switches $325_1, \ldots, 325_{16}$ of the first switch area $324_a$. The other ends of the waveguides $329_{33}, \ldots, 329_{49}$ are respectively connected to one of the inputs of the switches $325_{17}, \ldots, 325_{24}$ of the second switch area $324_b$.

As in the other disclosed embodiments, the waveguides $329_1, \ldots, 329_{48}$ in the first and second mesh areas $326_a$, $326_b$ are crossed in sets $327_1, 327_2, 327_3, 327_4, 327_5, 327_6$ of waveguides. In the illustrated embodiment, sets $327_1$ crosses with set $327_2$, set $327_3$ crosses with set $327_4$, and set $327_5$ crosses with set $327_6$. In the illustrated embodiment, the number of waveguides in each set $327_1, 327_2, 327_3, 327_4, 327_5, 327_6$ is eight, matching the number N of outputs from the switch 300. It should be appreciated, however, that even though the waveguides $329_1, \ldots, 329_{48}$ are grouped into sets $327_1, 327_2, 327_3, 327_4, 327_5, 327_6$, and each set $327_1, 327_2, 327_3, 327_4, 327_5, 327_6$ crosses another set, one waveguide in each set will not cross another waveguide as that waveguide will already be in proper position for its connection to a switch (e.g., waveguides $329_1, 329_{32}, 329_{33}, 329_{48}$ do not cross other waveguides even though they are part of a set).

In this embodiment, the 4×8 multicast switch 300 will have at most (N−1)×log 2 (M) crossings. That is, with the number M of inputs being four and the number N of outputs being eight, the worst case crossing will be (8−1)×log 2 (4) or 14. The convention method would have up to (8−1)×(4−1) or 21 crossings.

FIG. 8 illustrates another example of a 4×8 multicast switch 400 constructed in accordance with the disclosed principles. In the FIG. 8 embodiment, waveguide mesh areas $422_a$, $422_b$ and $422_c$ are used as in a splitter area instead of being used in the switch area as shown in prior embodiments. In a desired embodiment, all of the components in the switch 400 are connected to or part of the same substrate. As there are four inputs into the switch 400, the waveguides within the mesh areas $422_a$, $422_b$ and $422_c$ are crossed in sets of four (additional notations are not present in FIG. 8 to prevent cluttering of the figure). The first mesh area $422_a$ splits in to the second mesh area $422_b$ via crossings of sets of four waveguides. The second mesh area $422_b$ splits in to the third mesh area $422_c$ via additional crossings of sets of four waveguides. The waveguides of the third mesh area $422_c$ cross in sets of four waveguides, which are connected to the inputs of the switch area 424. The outputs of the switch area 424 serve as the outputs of the switch 400. The illustrated 4×8 switch 400 will have a maximum of 9 crossings (i.e., (4−1)× log 2 (8)), which is even more advantageous than the FIG. 7 switch 300.

It should also be appreciated that other types of switches and splitters can benefit from a similar waveguide arrangement FIG. 9 illustrates a 4×8 optical switch 500 that is not a multicast switch. The switch 500 includes five switch areas $510_a$, $510_b$, $510_c$, $510_d$, $510_e$ and three waveguide mesh areas $520_a$, $520_b$, $520_c$. In a desired embodiment, all of the components in the switch 500 are connected to or part of the same substrate. The first switch area $510_a$ comprises four 1×2 switches connected to one of four inputs to the switch 500. Outputs of the switches from the first switch area $510_a$ are connected to one of the waveguides in the first mesh area $520_a$. As can be seen, the waveguides in the first mesh area $520_a$ are crossed in sets $530_1$, $530_2$ of four waveguides. The other ends of the waveguides in the first mesh area $520_a$ are connected to respective inputs of 1×2 switches in the second switch area $510_b$.

The outputs of the switches second switch area $510_b$ are connected to a respective one of the waveguides in the second mesh area $520_b$. As can be seen, the waveguides in the second mesh area $520_b$ are also crossed in sets $530_3$, $530_4$, $530_5$, $530_6$ of four waveguides. The other ends of the waveguides in the second mesh area $520_b$ are connected to respective inputs of 1×2 switches in the third switch area $510_c$. The outputs of the switches in the third switch area $510_c$ are connected to a respective one of the waveguides in the third mesh area $520_c$. The waveguides in the third mesh area $520_c$ are also crossed in sets $530_7, \ldots, 530_{14}$ of four waveguides. The other ends of the waveguides in the third mesh area $520_c$ are connected to respective inputs of 2×1 switches in the fourth switch area $510_d$. Outputs of the switches in the fourth switch area $510_d$ are connected to respective inputs of the inputs to 2×1 switches in the fifth switch area $510_e$. The outputs from the switches in the fifth switch area $510_e$ comprise the outputs of the switch 500.

It should be appreciated that the switch 500 achieves similar crossing reductions as discussed above with respect to other embodiments disclosed herein. Likewise, the reduction of crossings reduces the complexity of the switch 500, leaving room for larger crossing angles where crossings are required, which reduces crosstalk in the switch. It should also be appreciated that the novel features of the embodiment are not limited to a 4×8 switch and that any number of inputs and outputs (along with the appropriate mesh areas and switches) could be used.

FIG. 10 illustrates a 4×8 splitter 600 constructed in accordance with another disclosed embodiment. The splitter 600 has four waveguide mesh areas 610a, 610b, 610c, 610d and a switch 620. In a desired embodiment, all of the components in the splitter 600 are connected to or part of the same substrate. The first mesh area 610a comprises four waveguides connected as inputs into the splitter 600. The waveguides of the first mesh area 610a split in to the second mesh area $610_b$ via crossings of sets of four waveguides. The second mesh area $610_b$ splits in to the third mesh area $610_c$ via additional crossings of sets of four waveguides. The third mesh area $610_c$ splits in to the fourth mesh area $610_d$ via additional crossings of sets of four waveguides. The waveguides of the fourth mesh area $610_d$ are connected to the inputs of the switch area 620. The outputs of the switch area 620 serve as the outputs of the splitter 600.

It should be appreciated that the splitter 600 achieves similar crossing reductions and crosstalk reductions as discussed above with respect to the switch embodiments disclosed herein. It should also be appreciated that the novel features of the embodiment are not limited to a 4×8 splitter and that any number of inputs and outputs (along with the appropriate mesh areas and switches) could be used. Moreover, as shown above, the techniques of the disclosed embodiments can also be applied to active splitter/active combiner (AS/AC) and passive splitter/passive combiner (PS/PC) architectures.

The foregoing examples are provided merely for the purpose of explanation and are in no way to be construed as limiting. While reference to various embodiments is made, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

Additionally, the purpose of the Abstract is to enable the patent office and the public generally, and especially the scientists, engineers and practitioners in the art who are not familiar with patent or legal terms or phraseology, to determine quickly from a cursory inspection the nature of the technical disclosure of the application. The Abstract is not intended to be limiting as to the scope of the present inventions in any way.

What is claimed is:
1. An optical switching element comprising:
  a first stage having M inputs and being adapted to split each input into N first stage outputs, wherein M and N are integers greater than one; and
  a second stage connected to the N first stage outputs and having N outputs,
    the second stage comprising at least first and second waveguide areas and at least first and second output switch areas,
      the first waveguide area comprising a plurality of waveguides connected between the first stage outputs and inputs of switches in the first output switch area, and
      the second waveguide area comprising a plurality of waveguides connected between outputs of the switches in the first output switch area and inputs of switches in the second output switch area, wherein
    the waveguides in the first and second waveguide areas are grouped into first sets of waveguides and second sets of waveguides, respectively,
      each set of waveguides, of the first sets of waveguides and the second sets of waveguides, including a quantity of waveguides that matches at least one of a quantity of the M inputs or a quantity of the N outputs, each set of waveguides, of the first sets of waveguides, crosses waveguides in one other set of waveguides of the first sets of waveguides, and each set of waveguides, of the second sets of waveguides, crosses waveguides in one other set of waveguides of the second sets of waveguides.

2. The optical switching element of claim 1, wherein M is four and N is four, and
a quantity of waveguides in the first sets of waveguides and the second sets of waveguides is four.

3. The optical switching element of claim 1, wherein M is eight and N is eight,
the second stage further comprises a third waveguide area comprising a plurality of waveguides connected between outputs of the switches in the second output switch area and inputs of switches in a third output switch area,
the waveguides in the third waveguide area being grouped into third sets of waveguides, and
a quantity of waveguides in the first sets of waveguides, the second sets of waveguides, and the third sets of waveguides is eight.

4. The optical switching element of claim 1, wherein M is four and N is eight, and
a quantity of waveguides in the first sets of waveguides and the second sets of waveguides is eight.

5. The optical switching element of claim 1, wherein M is four and N is eight,
the second stage further comprises a third waveguide area comprising a plurality of waveguides connected between outputs of the switches in the second output switch area and inputs of switches in a third output switch area,
the waveguides in the third waveguide area being grouped into third sets of waveguides, and
a quantity of waveguides in the first sets of waveguides, the second sets of waveguides, and the third sets of waveguides is four.

6. The optical switching element of claim 1, wherein a quantity of waveguide crossings for a given waveguide path is at most (N−1)×log 2 (M).

7. An optical network element comprising M inputs and N outputs, the optical network element comprising:
at least one stage comprising first and second waveguide areas, wherein waveguides in the first and second waveguide areas are grouped into first sets of waveguides and second sets of waveguides, respectively,
each set of waveguides, of the first sets of waveguides and the second sets of waveguides, including a quantity of waveguides that matches at least one of a quantity of the M inputs or a quantity of the N outputs,
each set of waveguides, of the first sets of waveguides, crosses waveguides in one other set of waveguides of the first sets of waveguides, and
each set of waveguides, of the second sets of waveguides, crosses waveguides in one other set of waveguides of the second sets of waveguides.

8. The optical network element of claim 7, wherein the at least one stage further comprises a third waveguide area comprising a plurality of waveguides,
the waveguides in the third waveguide area being grouped into third sets of waveguides.

9. The optical network element of claim 7, wherein M is four and N is four, and
a quantity of waveguides in the first sets of waveguides and the second sets of waveguides is four.

10. The optical network element of claim 7, wherein the optical network element is an M×N multicast switch.

11. The optical network element of claim 7, wherein the optical network element is an M×N optical switch.

12. The optical network element of claim 7, wherein the optical network element is an M×N splitter.

13. The optical network element of claim 7, wherein a quantity of waveguide crossings for a given waveguide path is at most (N−1)×log 2 (M).

14. An optical network element comprising:
a first stage having M inputs and a plurality of first stage outputs; and
a second stage connected to the plurality of first stage outputs and having N outputs,
the second stage comprising first and second waveguide areas and first and second output areas,
the first waveguide area comprising a plurality of waveguides connected between the first stage outputs and inputs of the first output area, and
the second waveguide area comprising a plurality of waveguides connected between outputs of the first output area and inputs of the second output, wherein
the waveguides in the first and second waveguide areas are grouped into first sets of waveguides and second sets of waveguides, respectively,
each set of waveguides, of the first sets of waveguides and the second sets of waveguides, including a quantity of waveguides that matches at least one of a quantity of the M inputs or a quantity of the N outputs,
each set of waveguides, of the first sets of waveguides, crosses waveguides in one other set of waveguides of the first sets of waveguides, and
each set of waveguides, of the second sets of waveguides, crosses waveguides in one other set of waveguides of the second sets of waveguides.

15. The optical network element of claim 14, wherein M is four and N is four, and
a quantity of waveguides in the first sets of waveguides and the second sets of waveguides is four.

16. The optical network element of claim 14, wherein M is eight and N is eight,
the second stage further comprises a third waveguide area comprising a plurality of waveguides connected between outputs of the second output area and inputs of a third output area,
the waveguides in the third waveguide area being grouped into third sets of waveguides, and
a quantity of waveguides in the first sets of waveguides, the second sets of waveguides, and the third sets of waveguides is eight.

17. The optical network element of claim 14, wherein M is four and N is eight and
a quantity of waveguides in the first sets of waveguides and the second sets of waveguides is eight.

18. The optical network element of claim 14, wherein M is four and N is eight,
the second stage further comprises a third waveguide area comprising a plurality of waveguides connected between outputs of the second output area and inputs of a third output area,
the waveguides in the third waveguide area being grouped into third sets of waveguides, and
a quantity of waveguides in the first sets of waveguides, the second sets of waveguides, and the third sets of waveguides is four.

19. The optical network element of claim 14, wherein a quantity of waveguide crossings for a given waveguide path is at most $(N-1) \times \log 2\, (M)$.

20. The optical network element of claim 7, wherein M is four and N is eight, and
a quantity of waveguides in the first sets of waveguides and the second sets of waveguides is eight.

* * * * *